United States Patent
Shikano et al.

(10) Patent No.: US 8,990,372 B2
(45) Date of Patent: Mar. 24, 2015

(54) OPERATION MANAGING DEVICE AND OPERATION MANAGEMENT METHOD

(75) Inventors: Hiroaki Shikano, Yokohama (JP); Junji Yamamoto, Saitama (JP); Tatsuya Saito, Kunitachi (JP)

(73) Assignee: Hitachi, Ltd., Tokyo (JP)

( * ) Notice: Subject to any disclaimer, the term of this patent is extended or adjusted under 35 U.S.C. 154(b) by 302 days.

(21) Appl. No.: 13/487,720

(22) Filed: Jun. 4, 2012

(65) Prior Publication Data

US 2012/0317259 A1    Dec. 13, 2012

(30) Foreign Application Priority Data

Jun. 8, 2011   (JP) .................................. 2011-128042

(51) Int. Cl.
| | |
|---|---|
| G06F 15/173 | (2006.01) |
| H04L 12/00 | (2006.01) |
| H04L 12/64 | (2006.01) |
| G06F 13/10 | (2006.01) |

(52) U.S. Cl.
CPC ............ *H04L 12/00* (2013.01); *H04L 12/6418* (2013.01); *G06F 13/10* (2013.01)
USPC ........................................................ 709/223

(58) Field of Classification Search
USPC ........................................................ 709/223
See application file for complete search history.

(56) References Cited

U.S. PATENT DOCUMENTS

2007/0288774 A1*  12/2007  Tanaka .......................... 713/300

FOREIGN PATENT DOCUMENTS

| | | |
|---|---|---|
| JP | 2007-026391 A | 2/2007 |
| JP | 2008-117029 A | 5/2008 |

* cited by examiner

*Primary Examiner* — Tu Nguyen
(74) *Attorney, Agent, or Firm* — Mattingly & Malur, PC

(57) ABSTRACT

Operation management of equipment is made efficient by verifying a plurality of operation management manipulations on a plurality of equipment and optimizing a manipulation order before executing the manipulations. A status of equipment in a status table; a content of a manipulation in a manipulation table; a process time of the manipulation in a manipulation time prediction table; and a status required for the manipulation in the manipulation table are memorized on an operation model managing server. When a plurality of manipulations are input for a plurality of equipment by an operation manager via an operation managing server, correctness of the manipulations is verified and a manipulation order is decided on an operation verifying server based on the various types of memorized information. Also, a manipulation end time of each manipulation is notified to the operation manager via the operation managing server.

15 Claims, 21 Drawing Sheets

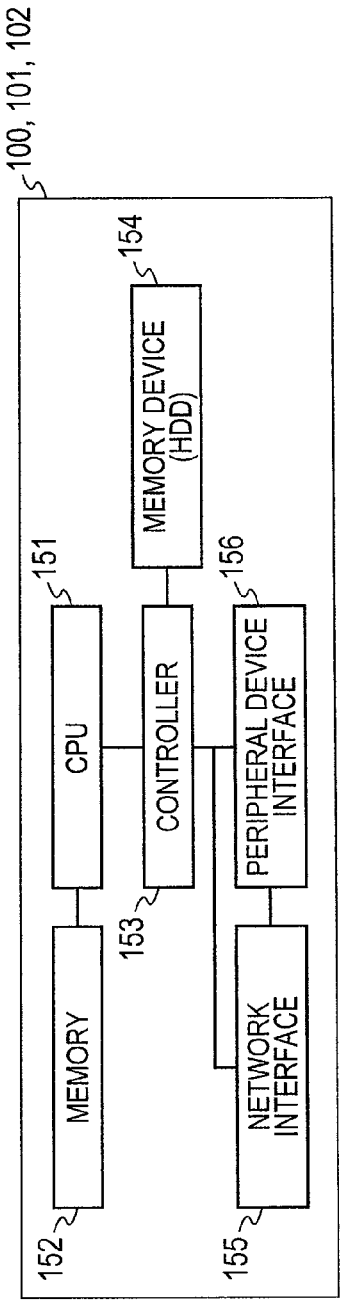

| EQUIPMENT TYPE | POSSIBLE STATUS | MEANING |
|---|---|---|
| pserver | power, nw_adrs, temp, user_process | PHYSICAL SERVER |
| vserver | power, nw_adrs, user_process, host_srv | VIRTUAL SERVER |
| router | power, nw_adrs, throughput | ROUTER |
| aircond | power, nw_adrs, temp, humidity | AIR CONDITIONING |
| ups | power, nw_adrs, volt | NON-SERVICE INTERRUPTION POWER SOURCE |
| storage | power, nw_adrs, vol_total, vol_used, file, throughput | STORAGE |
| camera | power, nw_adrs | SECURITY CAMERA |
| sgate | power, nw_adrs | SECURITY GATE |

FIG. 4

| STATUS NAME 210 | SELECTED VALUE 211 | SUB STATUS 212 | SELECTED VALUE 213 | UPDATE FREQUENCY 214 | MEANING OF STATUS 215 |
|---|---|---|---|---|---|
| power | on, off | - | - | 1ms | POWER SOURCE STATUS |
| temp | [-30,60] | - | - | 10s | TEMPERATURE |
| humidity | [0,100] | - | - | 10s | HUMIDITY |
| volt | [0,250] | input<br>output | [0,250]<br>[0,250] | 200ms | SUPPLIED VOLTAGE |
| vol_used | [0,2^64] | - | - | 1s | USED VOLUME |
| vol_total | [0,2^64] | - | - | 1s | VOLUME |
| throughput | [0,2^32] | - | - | 1s | EFFECTIVE BANDWIDTH |
| user_process | [0,4096] | - | - | 1s | USER PROCESS NUMBER |
| nw_adrs | - | ip<br>subnet<br>gw | [0,2^32]<br>[0,2^32]<br>[0,2^32] | OP | NETWORK ADDRESS |
| host_srv | pserver | | | OP | HOST SERVER |
| file | LIST | name<br>size | FILE_NAME<br>[0,2^64] | OP | FILE |

| RULE NAME | STATUS | CONDITION | MEANING |
|---|---|---|---|
| rl_psrv_power | pserver.power=on | pserver#ups.power=on & pserver#aircond.power=on | PHYSICAL SERVER ON: UPS, AIR CONDITIONING SHOULD BE TURNED ON |
| rl_psrv_ip_adrs | pserver.ipadrs=* | pserver.ip_adrs=[10.0.10.1-9] | WITHIN SETTING RANGE OF IP ADDRESS OF PHYSICAL SERVER |
| rl_sgate_power | sgate.power=* | sgate.power=on | POWER SOURCE OF SECURITY GATE IS ALWAYS TURNED ON |
| rl_storage_vol | storage.vol_used=* | storage.vol_used<storage.vol_total | THERE IS AVAILABLE SPACE IN STORAGE VOLUME |
| rl_vm_power | vserver.power=on | vserver.host_srv.power=on | PHYSICAL SERVER THAT HOSTS VIRTUAL SERVER IS TURNED ON |

FIG. 6

| 123 | 230 | 231 | 232 |
|---|---|---|---|
| | EQUIPMENT NAME | TYPE | STATUS DEFINITION |
| | ps1 | pserver | power=off, user_process=0, nw_adrs[0]->ip=10.0.10.10 |
| | ps2 | pserver | power=off, user_process=0, nw_adrs[0]->ip=10.0.10.11 |
| | ps3 | pserver | power=off, user_process=0, nw_adrs[0]->ip=10.0.10.12 |
| | vm1 | vserver | power=off, host=ps1, user_process=0, nw_adrs[0]->ip=10.0.11.1 |
| | ups1 | ups | power=off, supply_volt=100, nw_adrs[0]->ip=10.0.1.11 |
| | router1 | router | power=off, nw_adrs[0]->ip=10.0.10.1, nw_adrs[1]->ip=10.0.1.10 |
| | airc1 | aircond | power=off, temp=20, humidity=60, nw_adrs->ip=10.0.1.10 |
| | str1 | storage | power=off, file_list=[], vol_total=1TB, vol_used=0, nw_adrs->ip=10.0.10.20 |
| | str2 | storage | power=off, file_list=[], vol_total=500GB, vol_used=0, nw_adrs->ip=10.0.10.21 |
| | cam1 | camera | power=off, nw_adrs->ip=10.0.1.12 |
| | gate1 | sgate | power=off, nw_adrs->ip=10.0.1.13 |

FIG. 7

| EQUIPMENT NAME | DEPENDENT ON | TYPE |
|---|---|---|
| ps1,ps2,ps3,str1,str2 | ups1 | PHYSICALLY_CONNECTED |
| str1,str2 | ps1,ps2,ps3,vm1,vm2 | LOGICALLY_CONNECTED |
| vm1,vm2 | ps1,ps2,ps3 | HOSTED |

FIG. 8

| 125 | | | | | | |
|---|---|---|---|---|---|---|
| 250 | 251 | 252 | 253 | 254 | 255 | 256 |
| MANIPULATION NAME | SUBJECT EQUIPMENT TYPE | MANIPULATION PARAMETER | MANIPULATION CONDITION | POST-MANIPULATION STATUS | REFERENCE MANIPULATION TIME | MANIPULATION NAME |
| power_on | pserver | SERV:pserver | SERV.power=off | SERV.power=on | REF | TURN ON POWER SOURCE OF SERVER |
| copy_file | storage | FROM:storage, TO:storage, FILE:LIST | Exist(FILE, FROM.file) | Append(FILE, TO.file), TO.vol_used+=FROM.file[FILE].->size | REF | BACK UP FILE |
| power_off | pserver | SERV:pserver | SERV.power=on & SERV.user_process=0 | SERV.power=off | REF | TURN OFF POWER SOURCE OF SERVER |
| assign_vm | vserver | VSERV:vserver PSERV:pserver | VSERV.power=off | VSERV.host_srv=PSERV | 10s | ALLOCATE VM |
| power_on | vserver | VSERV:vserver | VSERV.power=off | VSERV.power=on | REF | ACTIVATE VM |
| start_appli | pserver, vserver | SERV:pserver, vserver, APP:string | SERV.power=on | Append(SERV.process, APP) | REF | ACTIVATE APPLICATION |
| stop_appli | pserver, vserver | SERV:pserver, vserver, APP:string | SERV.power=on & Exist(SERV.process, APP) | Remove(SERV.process, APP) | REF | TERMINATE APPLICATION |
| exec_batch | pserver, vserver | SERV:pserver, vserver, BATCH:string | SERV.power=on & SERV.user_process <=2 | Execute(SERV, BATCH) | REF | EXECUTE BATCH |

FIG. 9

| IDENTIFIER 260 | SUBJECT MANIPULATION 261 | TYPE 262 | CALCULATION FORMULA OR TIME 263 |
|---|---|---|---|
| time_file_copy | copy_file | EstimatedEQ | Sum(FILE.file_size)/Min(FROM.throughput, TO.throughput) |
| time_power_on | power_on | MeasuredVL | PSERV==ps1:45s |
| time_power_off | power_off | MeasuredVL | PSERV==ps1:30s |
| time_batch_exec | Exec_batch | MeasuredVL | BATCH==bath1:40s<br>BATCH==bath2:20s |
| time_start_appli | start_appli | MeasuredVL | (SERV==vm1&&APP==appli1):25s<br>(SERV==ps1&&APP==appli2):20s |
| time_stop_appli | stop_appli | MeasuredVL | (SERV==ps1&&APP==appli2):15s |

| CORRESPONDING MANIPULATION NAME (127) | SUBJECT EQUIPMENT (271) | GENERATED COMMAND (272) |
|---|---|---|
| power_on | PSERV=ps1 | /sbin/poweron {PSERV.nw_adrs[0].ip} now |
| copy_file | FROM:str1, To:str2 | rcp USER@PASS:{FROM.nw_adrs[0].ip}/FROM_DIR/FILE USER@PASS:{TO.nw_adrs[0].ip}/TO_DIR/FILE |
| power_off | PSERV=ps1 | rsh -l admin:opensesame {PSERV.nw_adrs[0].ip} /sbin/shutdown -h now |
| assign_vm | VSERV=vm1, PSERV=ps1 | /sbin/assign_vm VSERV PSERV |

STATUS NO.: 1102021205051, UPDATE TIME: 2011/2/2 12:05:05

| EQUIPMENT NAME | TYPE | RECORDED STATUS |
|---|---|---|
| ps1 | pserver | power=on, user_process=5, nw_adrs[0]->ip=10.0.10.10 |
| ps2 | pserver | power=on, user_process=8, nw_adrs[0]->ip=10.0.10.11 |
| ps3 | pserver | power=off, user_process=0, nw_adrs[0]->ip=10.0.10.12 |
| vm1 | vserver | power=on, host=ps2, user_process=0, nw_adrs[0]->ip=10.0.11.1 |
| ups1 | ups | power=on, supply_volt=100, nw_adrs[0]->ip=10.0.1.11 |
| router1 | router | power=on, nw_adrs[0]->ip=10.0.10.1, nw_adrs[1]->ip=10.0.1.100 |
| airc1 | aircond | power=on, temp=23, humidity=50, nw_adrs->ip=10.0.1.10 |
| str1 | storage | power=on, file_list=[xxx], vol_total=1TB, vol_used=10GB, nw_adrs->ip=10.0.10.20 |
| str2 | storage | power=on, file_list=[xxx], vol_total=500GB, vol_used=45GB, nw_adrs->ip=10.0.10.21 |
| cam1 | camera | power=on, nw_adrs->ip=10.0.1.12 |
| gate1 | sgate | power=on, nw_adrs->ip=10.0.1.13 |

FIG. 12

| TIME | MANIPULATION NAME | MANIPULATION PARAMETER | STATUS NO. |
|---|---|---|---|
| 2011/2/2 09:35:20 | power_on | SERV=ps1 | 11020020935201 |
| 2011/2/2 09:37:34 | assign_vm | VSERVER=vm1, PSERVER=ps1 | 11020020937341 |
| 2011/2/2 09:38:25 | power_on | SERV=vm1 | 11020020938251 |

FIG. 16

| | TASK A (MANAGER A) | TASK B (MANAGER B) | TASK C (MANAGER C) |
|---|---|---|---|
| TASK NAME | | | |
| TASK TYPE | SERVER REACTIVATION, VIRTUAL SERVER ACTIVATION | FIXED-TIME BATCH PROCESS | FIXED-TIME BACKUP |
| TASK PRIORITY | 10 | 5 | 2 |
| OPERATION LIST | [ps1] POWER SOURCE OFF ~410<br>[ps1] POWER SOURCE ON ~411<br>[vm1] HOST ps1 ALLOCATION ~412<br>[vm1] VM POWER SOURCE ON ~413<br>[vm1] APPLICATION 1 ACTIVATION ~414 | [ps1] APPLICATION 2 ACTIVATION ~416<br>[ps1] BATCH 1 EXECUTION ~417<br>[ps1] APPLICATION 2 TERMINATION ~418 | [str1] BACKUP ~415<br>[ps1] BATCH PROCESS ~419 |

```
 1:  ... (abbreviated)
 2:  May 2 10:00:02 ps1 kernel: system shutdown started.
 3:  :::
 4:  May 2 10:00:36 ps1 kernel: system start-up
 5:  May 2 10:00:38 ps1 kernel: Linux version 2.6.25-14.fc9.i686
 6:  May 2 10:01:11 ps1 kernel: Registered new address 192.168.10.2 on eth1.IPv4.
 7:  :::
 8:  May 2 10:01:16 ps1 sysmon: system normally booted up
 9:  :::
10:  May 2 10:01:29 ps1 sysmon: Virtual machine VM1 assigned to ps1.
11:  May 2 10:01:39 ps1 sysmon: Application 2 launched.
12:  May 2 10:01:42 ps1 sysmon: Virtual machine VM1 starting.
13:  :::
14:  May 2 10:01:52 ps1 sysmon: Execution of batch1.sh started.
15:  :::
16:  May 2 10:01:23 ps1 sysmon: [Alert] Execution of batch1.sh failed at line 35.
17:  ...
```

450

OPERATION MANAGING DEVICE AND OPERATION MANAGEMENT METHOD

CLAIM OF PRIORITY

The present application claims priority from Japanese patent application JP2011-128042 filed on Jun. 8, 2011, the content of which is hereby incorporated by reference into this application.

BACKGROUND OF THE INVENTION

The present invention relates to a technique of optimizing operation management verification on equipment such as a server in a data center, and making operation management efficient.

With rapid improvements and widespread use of communication networks, cloud computing that realizes uses of information systems via networks has been becoming more widely used rapidly. As a result, data centers storing the systems have become larger in scales, and have spread out globally; therefore, costs in operation management of the systems have become a serious problem. For example, operation management of a data center includes a wide range of operations on a vast number of servers and network equipment such as confirmation of a work status of equipment, reactivation, batch process, disk backup, handling of abnormalities, and reporting of these operations to clients, and further includes operations on non-information technology (IT) equipment other than servers such as management of air conditioning and power sources, security monitoring and entrance/exit management. Enhancement of operation efficiency is unavoidably necessary. To cope with the problem, efforts for more efficient operation management aimed to reduction of operation management costs have been made such as unification of system operation management by operation management middleware, standardization of an operation management process by Information Technology Infrastructure Library (ITIL) and automation of an operation task procedure by a run book automation.

However, these efforts depend on automation by, for example, a regular process by a business application and disk backup; thus, they do not go so far as to automate commands for system maintenance and the like of, for example, reactivation and setting of each equipment, and accordingly are performed mainly by manpower. However, operation errors attributable to human errors cannot be avoided with management by manpower, and there is a problem that further process steps are required to handle errors that have occurred. Also, as described above, operation management includes a wide range of tasks and diverse operations on information systems such as servers and networks and those such as management of air conditioning and power sources, security monitoring and entrance/exit management. Management of the interconnected tasks and operations increases a possibility of occurrence of errors. Also, when a plurality of managers are involved in operation management, miscommunication occurs, and contributes to occurrence of errors. Furthermore, when an error occurs, it is very difficult to investigate which manipulation is the cause because the investigation requires tracking of past manipulations by analyzing a log of each equipment.

Methods for automatically executing commands to prevent occurrence of failures have so far been proposed. For example, Japanese Patent Application Laid-Open Publication No. 2008-117029 discloses a fraud procedure checkout method at the time of creating an operation procedure for preventing in advance fabrication of a fraud procedure without depending on an operator who creates the operation procedure. Fabrication of a fraud procedure is prevented by registering server configuration and client information as configuration information, and registering a possibility of performing a procedure according to a performance time zone as a policy. Also, Japanese Patent Application Laid-Open Publication No. 2007-26391 discloses a method of judging a possibility of execution with a command execution judging unit based on execution conditions defined in operations rules, and resource information of a management subject.

BRIEF SUMMARY OF THE INVENTION

In view of the related art, a problem of a current data center operation management is that further efficiency is required for an operation task on conventional operation management subject equipment. First, when manipulating equipment, for example a work is proceeded with out confirming a prerequisite for a manipulation, and accordingly the manipulation itself is done wrong or an error occurs in a parameter related to the manipulation. Next, when a plurality of operation managers are involved in operations of equipment, information that there is dependence in, for example, an execution order of a plurality of manipulations on the equipment may not be shared by the operation managers, and this may cause an error. Also, when a single operation manager performs operations on a plurality of equipment simultaneously, there may be dependence in, for example, an execution order among a plurality of manipulations likewise, the operation manager may overlook the dependence, and this may cause an error. Also, an operation manager may not know a timing to confirm a result of a manipulation, that is, a timing at which the manipulation ends, and thus an operation may take time longer than necessary. Also, in confirming a result of a manipulation, it takes a lot of labor to extract appropriate items to verify from operation statuses of equipment, and confirm correctness of manipulations.

An object of the present invention is to address the above-described problem, and to provide an operation managing device and an operation management method that can make operation management of equipment efficient by verifying a plurality of operation management manipulations on a plurality of operation management subject equipment, and optimizing a manipulation order before executing them.

To achieve the above object, the present invention provides an operation managing device including an operation managing unit that performs manipulations on a plurality of operation management subject equipment, wherein the operation managing unit is provided with a memory unit and a processing unit; the memory unit memorizes a status of the operation management subject equipment that varies due to the manipulations, process time for each of the manipulations, and a status condition required for the manipulations; and the processing unit decides, when a plurality of the manipulations are input, a manipulation order of the manipulations according to the status of the operation management subject equipment, the process time and the status condition that are memorized.

Also, in order to achieve the above object, the present invention provides an operation management method performed by operation managing equipment that performs manipulations on a plurality of operation management subject equipment, the method including: memorizing a status of the operation management subject equipment that varies due to the manipulations, process time for each of the manipulations, and a status condition required for the manipulations; and deciding, when a plurality of the manipulations are input, a manipulation order of the manipulations according to the status of the operation management subject equipment, the process time and the status condition that are memorized.

Correctness of a plurality of manipulations that are input can be verified before execution by modeling statuses of operation management subject equipment and the manipulations, and memorizing resources, manipulation conditions and manipulation time required for the manipulations. Also, an execution order can be optimized to minimize execution time of the plurality of manipulations. Also, correctness of manipulations can be confirmed easily by outputting items to be confirmed, for each manipulation, based on execution end timings and operation statuses of operation management subject equipment. As a result, an operation management task of a data center can be made efficient.

BRIEF DESCRIPTION OF THE DRAWINGS

FIG. 2 is a diagram that explains a representative configuration example of various servers according to the first embodiment;

FIG. 3 is a diagram that explains an equipment type table according to the first embodiment;

FIG. 4 is a diagram that explains a status table according to the first embodiment;

FIG. 5 is a diagram that explains a status rule table according to the first embodiment;

FIG. 6 is a diagram that explains an equipment definition table according to the first embodiment;

FIG. 7 is a diagram that explains a dependence table according to the first embodiment;

FIG. 8 is a diagram that explains a manipulation table according to the first embodiment;

FIG. 9 is a diagram that explains a manipulation time prediction table according to the first embodiment;

FIG. 10 is a diagram that explains a manipulation command conversion table according to the first embodiment;

FIG. 11 is a diagram that explains a status record table according to the first embodiment;

FIG. 12 is a diagram that explains a manipulation record table according to the first embodiment;

FIG. 16 is a table that explains an actual example of an operation according to the first embodiment;

FIG. 19 is a diagram that explains an example of a log output of a physical server according to the first embodiment;

DETAILED DESCRIPTION OF THE INVENTION

Hereinafter, various embodiments of the present invention are explained using figures. Although in the following explanation, a data center is exemplified as an IT system to be a subject of the present invention, the present invention can be applied to any other IT system.

First Embodiment

An operation verification/optimization system applied to a data center is explained as a first embodiment.
<Overall Configuration>

Figure 1:
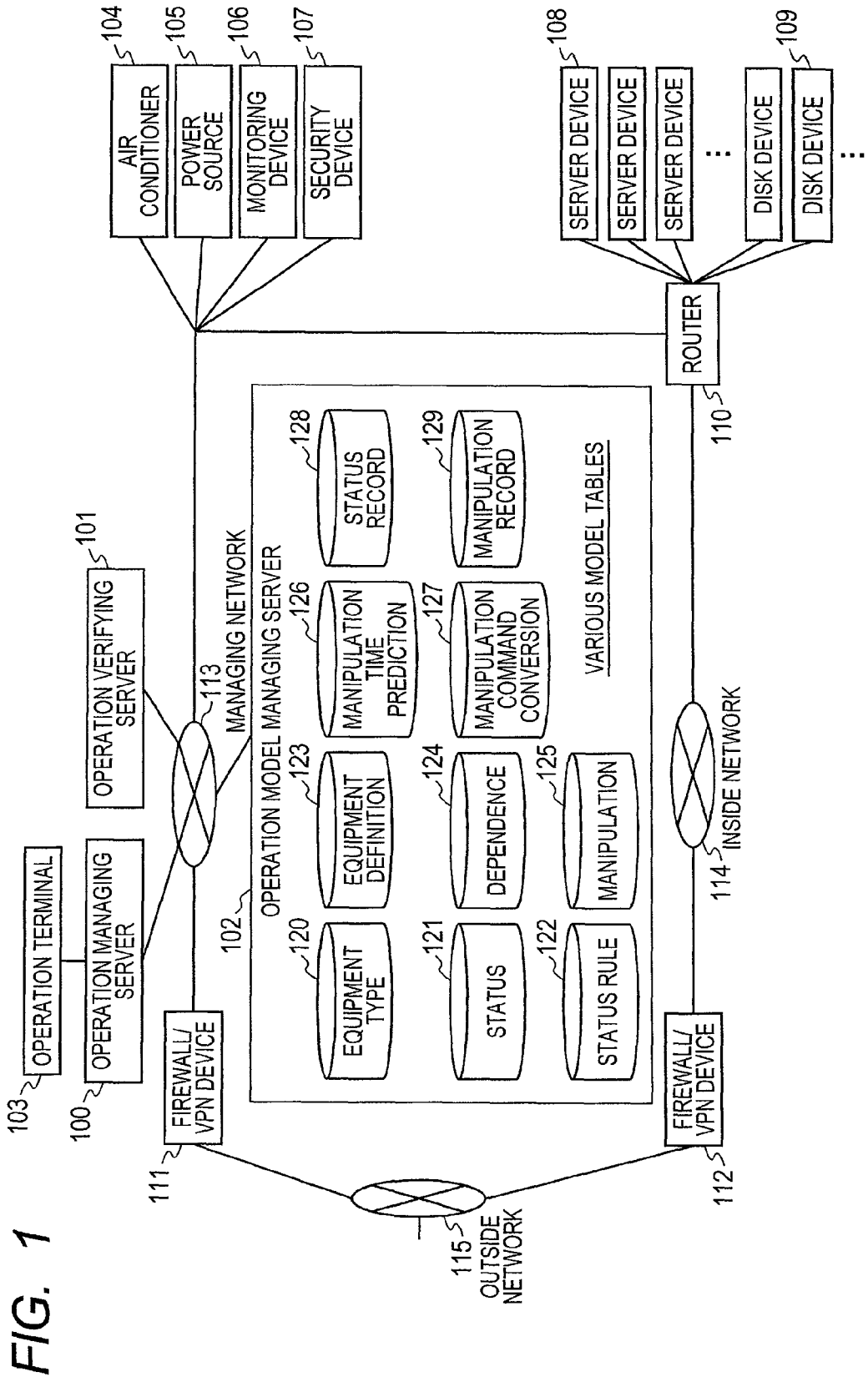
FIG. 1 is a diagram that shows an overall configuration of an operation verification/optimization system in a data center according to a first embodiment.

FIG. 1 is a diagram that shows an example of an operation verification system configuration in the data center of the first embodiment. The data center includes operation facility equipment and IT equipment such as server devices of the data center as devices to be operation management subjects of the verification system, that is, operation management subject equipment. The operation facility equipment of the data center includes: an air conditioner 104; a power source device 105 including a non-service interruption power source device and a power source stabilizing device; a monitoring device 106 including a monitoring camera and a human sensor; and a security device 107 including an input/output gate as shown in the upper right of FIG. 1. Also, the IT equipment of the data center includes server devices 108, disk devices 109 and a router 110 as shown in the lower right of FIG. 1. With the IT equipment and the operation facility equipment working in cooperation with each other in the data center, effects in terms of energy saving and power saving in operation management can be obtained.

Furthermore, the verification system constructs a managing network 113 separated from an inside network 114 that a user generally uses for accessing the IT equipment so that the user can confirm remotely command issuance and execution status of the operation management subject equipment, and connects to each equipment and device. The managing network 113 connects to an operation managing server 100 that manages each equipment, an operation verifying server 101 that implements processing of verifying operability of operations to each equipment and optimizing the operations and an operation model managing server 102 that stores and manages various types of information required for operation management of the equipment and verification and optimization of operations. In the present specification, the operation managing server 100, the operation verifying server 101 and the operation model managing server 102 are collectively called operation managing equipment or an operation managing unit in some cases. The operation managing equipment, or the operation managing unit, has a function of operation management of the verification system of the present embodiment, that is, a function of operation management of the operation management subject equipment, and verification and optimization of operations.

A terminal 103 with which an operation manager performs operations is connected to the operation managing server 100. The various servers 100 to 102 of the operation managing unit may be configured to be executed in a single server device partly or entirely. For example, the operation managing server 100 and the operation verifying server 101 may be a single server device, or the operation managing server 100, the operation verifying server 101 and the operation model managing server 102 may be a single server device. Alternatively, the various servers may be dispersed to several server devices by subdividing functions thereof or performing processes thereof in parallel, depending on the scale of equipment to be a management subject.

FIG. 2 shows a representative configuration example of the various servers in the operation verification/optimization system of the present embodiment. The servers 100, 101, 102 are configured with: a central processing unit (CPU) 151 that executes computation processes as a processing unit; a memory 152 that temporarily memorizes programs and data as a memory unit; a controller 153 that performs control of various interfaces; a memory device 154 such as a hard disk drive (HDD) that retains various types of data and programs as a memory unit; a network interface 155 that connects to an external network; and a peripheral device interface 156 that connects peripheral devices such as a display and a keyboard.

Also, the managing network 113 in FIG. 1 connects to an outside network 115 via a firewall/virtual private network (VPN) device 111. Accordingly, the various types of the equipment 104 to 110 to be management subjects described above, and the various servers 100 to 102 that perform management may be partly or entirely installed in another data center and the like via the outside network 115. That is, the data center may remotely manage the various types of the equipment existing in another data center, and a part or all of the servers required for management may be installed in a remote data center to manage the various types of the equipment of the data center. Also, the inside network 114 similarly connects to the outside network 115 via a firewall/VPN device 112.

The operation managing server 100 provides an operation manager with an interface for performing operations of subject equipment. In other words, the operation managing server 100 provides the operation manager with a unit for inputting operations and a unit for displaying an operation status and an operation execution status of the equipment via the connected terminal 103. Also, the operation managing server 100 creates a manipulation record and a status record of operation management subject equipment for verification and optimization of operations, and creates and updates various model tables 120 to 129 stored in the memory device 154 that is a memory unit of the operation model managing server 102. Details of a procedure of verification and optimization of operations in the operation verifying server 101 are described below.

<About Model Table>

Next, the various model tables 120 to 129 managed on the operation model managing server 102 are explained. It becomes possible to verify operability of operations input by an operation manager and optimize the operations by modeling and expressing a configuration and a status of operation management subject equipment in a table. In other words, because components of each table vary depending on types of operations to be subjects of verification for example, components of each table are required to be defined according to an intended verification or optimization function. The various model tables 120 to 129 are accumulated in the memory unit of the operation model managing server 102.

<Equipment Type Table>

First, a configuration of the equipment type table 120 is explained using FIG. 3. The table 120 defines types of equipment to be operation management subjects. Also, the table 120 defines a status each equipment can be in, that is, a status that should be modeled for each type of equipment. Types of statuses are defined in the status table 121 shown in FIG. 4. The equipment type table 120 is configured with a column item indicating equipment types 200 and a column item defining possible statuses of the equipment types 201.

In FIG. 3, a column item explaining types of the equipment defined in each row 202 is added. For example, an equipment type name "pserver" means a physical server, and the physical server can be in a status of "power" indicating a power source status, "nw_adrs" indicating a network address, "temp" indicating a temperature, and "user_process" indicating a user process number. Also, an equipment type name "vserver" means a virtual server, and the virtual server can be in a status of "power" indicating a power source status, "nw_adrs" indicating a network address, "user_process" indicating a user process number and "hostsrv" indicating a host server name. Likewise, a router "router", an air conditioner "aircond", a power source device "ups", a disk device "storage", a monitoring camera "camera" and a security gate "sgate" are defined.

<Status Table>

Next, a configuration of the status table 121 is explained using FIG. 4. The table 121 defines statuses of each operation management subject equipment, values corresponding to the statuses, and standard update frequencies of updating a status of a real system. The status table 121 is configured with: a column item indicating status names 210; a column item indicating types and ranges of values corresponding to the statuses 211; a column item defining sub statuses that are subdivided from the status names 212; a column item indicating types and ranges of values corresponding to the subdivided statues 213; and a column item indicating update frequencies for reflecting statuses on a real machine to statuses on the table 214. A column item explaining statuses defined each row 215 is added in FIG. 4. For example, the status name "power" indicates a power source status, and a value the status name can take is either "on" or "off". The update frequency 214 is 1 ms, and a power source status of a real machine is confirmed, and is reflected in the table every 1 millisecond unless otherwise specified. The status name "temp" indicates a temperature, a corresponding value the status name can take is within the range of −30 to 60, and an update frequency is every 10 seconds.

Also, the status name "nw_adrs" has the subdivided sub statuses 212 that define an IP address "ip", a subnet mask "subnet", and a gateway address "gw". The values the sub statuses can take are integers within an address range 0 to 2^32 of IPv4. An update frequency is "OP" which means that a network status of a real machined is confirmed and reflected in the table every time an operation related to a network address occurs. Expressions of a value range and the like shown in this example are merely exemplary, and expressions required for defining the items are implemented appropriately.

<Status Rule Table>

Next, a configuration of the status rule table 122 is explained using FIG. 5. The table 122 defines a steady relationship between statuses of each operation management subject equipment. By checking a relationship of statuses defined in the table for each operation or at each update of statuses, correctness of a system status can be confirmed. The status rule table 122 is configured with: a column item indicating status rule names 220; a column item indicating reference statuses 221; and a column item indicating status conditions related to the reference items 222. An item explaining status rules defined in each row 223 is added in FIG. 5. For example, a reference status of a status rule name "rl_psrv_power" is "pserver.power=on" which means a power source of a physical server is turned on. A status condition at this time is "pserver#ups.power=on&pserver#aircond.power=on" which shows that a power source of a power source device on which the physical server is dependent (to which the physical server is connected) is turned on, and a power source of an air conditioner on which the physical server is dependent (with which the physical server is cooled) should be turned on.

Also, for example, a reference status of a status rule name "rl_psrv_ip_adrs" is "pserver.ip_adrs=*", that is, an IP address of a physical server (the value is arbitrary). At this time, a status condition is "pserver.ip_adrs=[10.0.10.1-9]" which shows that the IP address of the physical server should be set within the range of 10.0.10.1 to 9. The value range and the method of indicating a relationship between equipment and statuses shown above are merely exemplary, and expressions required for defining the items are implemented appropriately.

<Equipment Definition Table>

Next, a configuration of the equipment definition table 123 is explained using FIG. 6. The table 123 defines real equipment to be an operation management subject, and also can define initial statuses. The equipment definition table 123 is configured with: a column item indicating equipment names 230; a column item indicating equipment types 231 defined in the equipment type table 120; and a column item indicating statues of each equipment 232. For example, an equipment type of an equipment name "ps1" is "pserver", that is, a physical server, and a status thereof is "power=off" (power source OFF), "user_process=0" (no user process), and "nw_adrs [0]→IP=10.0.10.10" (an IP address of a port No. 0 is 10.0.10.10). Likewise, physical servers "ps2", "ps3", a virtual server "vm1", a power source device "ups1", a router "router1", an air conditioner "airc1", disk devices "str1", "str2", a monitoring camera "cam1" and a security gate "sgate1" are defined in this example.

<Dependence Table>

Next, a configuration of the dependence table 124 is explained using FIG. 7. The table 124 defines topology or a connection relationship which is logical or physical dependence among equipment. For example, the table 124 defines dependence among servers that have a master-servant relationship, a server and peripheral equipment connected to the server, and the like. The dependence table 124 is configured with: a column item indicating names of equipment that is dependent 240; a column item indicating names of equipment on which the equipment that is dependent is dependent 241; and a column item indicating types of dependence 242.

In the example of FIG. 7, the physical servers "ps1", "ps2", "ps3" and the disk devices "str1", "str2" are dependent on the power source device "ups1", and the type of dependence is "PHYSICALLY_CONNECTED" indicating that the equipment is physically connected. This indicates that the physical servers and the disk devices are connected to and dependent on the power source device "ups1". Also, the disk devices "str1", "str2" are dependent on the physical servers "ps1", "ps2", "ps3", the virtual server "vm1", and a virtual server "vm2", and the type of dependence is "LOGICALLY_CONNECTED" showing that the equipment is logically connected. This shows that the disk devices are logically connected to and dependent on the physical servers or the virtual servers. Also, the virtual servers "vm1", "vm2" are dependent on the physical servers "ps1", "ps2", "ps3", and the type of dependence is "HOSTED" showing that the physical servers host the virtual servers. This shows that the virtual servers work on the physical servers.

<Manipulation Table>

Next, a configuration of the manipulation table 125 is explained using FIG. 8. The table 125 defines command manipulations that are operations of subject equipment by an operation manager. The command manipulations mean to change corresponding equipment statuses, and operations can be verified by associating the command manipulations with status changes on a model. The manipulation table 125 is configured with: a column item indicating manipulation names 250; a column item indicating equipment types of a manipulation subject 251; a column item indicating variables such as parameters in manipulations 252; a column item indicating status conditions at the time of manipulations 253; a column item indicating statuses after changes due to the manipulations 254; and a column item indicating time that the manipulations take 255.

In FIG. 8, a column item explaining contents of the manipulations defined in each row 256 is added. For example, a manipulation "power_on" of turning on a power source of a physical server is explained. An equipment type to be a manipulation subject is "pserver" which shows a physical server. A manipulation parameter is "SERV: pserver", and SERV is a specified physical server name. Next, a manipulation condition "SERV.power=off" defines that a status condition for performing the manipulation is that the power source of the server is turned off. Next, a status after the manipulation "SERV.power=on" defines that the manipulation changes the status of the power source of the server to "ON". Next, a definition of manipulation time is "REF" (reference) which shows to refer to the manipulation time prediction table 126 to calculate manipulation time.

A next manipulation of "copy_file" to perform file copy/backup is explained. An equipment type to be a manipulation subject is "storage" which shows a disk device. A manipulation parameter is "FROM: storage, TO: storage, FILE: LIST", "FROM" shows a copy source disk device, "TO" shows a copy destination disk device, and "FILE" shows a file name in a list expression. Next, a manipulation condition "Exist (FILE, FROM.file)" defines a status condition for performing the manipulation that the file "FILE" exists in the disk device "FROM". "Exist" means a function for performing a list manipulation (existence confirmation). Next, a status after the manipulation "Append (FILE, TO.file), TO.vol_used+=FROM.file [FILE]→size" defines that the file "FILE" is added to a file list in the disk device "TO", and a used volume of the disk device "TO" is increased by the size of the subject file. Next, a definition of manipulation time is "REF" which shows to refer to the manipulation time prediction table 126 to calculate manipulation time.

Likewise, turning off of a power source of a physical server (power_off); allocation of a virtual server (assign_vm); activation of a virtual serer (power_on), activation of an application (start_appli); termination of an application (stop_appli); execution of a batch (exec_batch) are defined in FIG. 8, for example. Expressions of manipulation conditions and various functions shown above are merely exemplary, and expressions and functions required for defining the items are implemented appropriately.

<Manipulation Time Prediction Table>

Next, a configuration of the manipulation time prediction table 126 is explained using FIG. 9. The table 126 defines calculation formulae of manipulation time or the manipulation time itself of manipulations defined in the manipulation table 125, and types of the table include a prediction type and an actual measurement type. The manipulation time prediction table 126 is configured with: a column item indicating identifiers 260; a column item indicating manipulations to be a subject of time prediction 261; a column item indicating whether an expression of manipulation time is a calculation formula or time 262; and a column item indicating a calculation formula or manipulation time 263. For example, an identifier "time_file_copy" indicates time that file copy takes, and a manipulation subject is "copy_file" defined in the manipulation table 125. The type is "EstimatedEQ" which indicates that manipulation time is expressed with a prediction calculation formula. In this example, a calculation formula is defined as "Sum (FILE.file_size)/Min (FROM.throughput, TO.throughput)", and means that manipulation time is obtained by dividing a total size of all copy subject files "FILE" with a smaller one of throughputs (byte/second) of the disk devices "FROM" and "TO". "Sum" is a function for obtaining a total value, and "Min" is a function for obtaining a minimum value. Also, a throughput is a specification value of a device or is obtained by measuring at the time of manipulation.

Next, for example, an identifier "time_start_appli" indicates time that application activation takes, and a manipulation subject is "start_appli" defined in the manipulation table 125. The type is "MeasuredVL" which indicates that the manipulation time is expressed based on an actual measurement. In this example, the time is defined as "(SERV==vm1&&APP=appli1):25S" and "(SERV==ps1&&APP=appli2): 20S", the manipulation time when the execution server "SERV" is a virtual server "VM1", and an execution subject application "APP" is "appli1" is 25 seconds, and the manipulation time when the execution server "SERV" is the physical server "ps1" and an execution subject application "APP" is "appli2" is 20 seconds.

Likewise, in FIG. 9, as another example, manipulation time of power source ON ("time_power_on"), power source OFF ("time_power_off"), batch execution ("time_batch_exec")", and application termination ("time_stop_appli") is defined.

<Manipulation Command Conversion Table>

Next, a configuration of the manipulation command conversion table 127 is explained using FIG. 10. The table 127 defines commands on a real machine corresponding to manipulations defined in the manipulation table 125. The manipulation command conversion table 127 is configured with: a column item indicating manipulation names 270 corresponding to those defined in the manipulation table 125; a column item indicating subject equipment 271; and a column item defining generated commands 272. For example, subject equipment of a power source ON manipulation "power_on" is the physical server "ps1.", and a command generated at the time is defined as "/sbin/poweron {PSERV.nw_adrs [0].ip} now" which means a remote power source ON for a service processor that controls "ps1". Likewise, in an example in FIG. 10, generated commands of file copy ("copy_file"), power source OFF ("power_off"), and allocation of a virtual server ("assign_vm") are defined. Calculation formulae, expressions of manipulation times and various functions shown above are merely exemplary, and expressions and functions required for defining the items are implemented appropriately.

<Status Record Table>

Next, a configuration of the status record table 128 is explained using FIG. 11. The table 128 stores therein statuses of operation management subject equipment, and records updates of equipment statuses. The status record table 128 is similar to the equipment definition table 123 and is configured with: a column item indicating equipment names 280; a column item indicating equipment types 281; a column item indicating statuses at the time of recording 282; and furthermore header information indicating status numbers that are serial numbers given at the time of recording, and the time of recording 283. The statuses at the time of recording 282 are just the same with the status items defined as initial statuses 232 in the equipment definition table 123. In this manner, records of statuses made, for example, at constant time intervals, at every status variation, or before and after operations are useful in investigating causes of errors and malfunctions and verifying operations.

<Manipulation Record Table>

Next, a configuration of the manipulation record table 129 is explained using FIG. 12. The table 129 records a history of operations (manipulations). The manipulation record table 129 is configured with: a column item indicating times 290; a column item indicating manipulation names 291 defined in the manipulation table 125; a column item indicating parameters of manipulations 292; and a column item indicating the status numbers 293 of the header information 283 of the status record table 128 recording statuses before and after manipulations. In this manner, records of a history of manipulations are useful in investigating causes of malfunctions attributable to manipulations.

<Process Flow of Operation Verification/Optimization>

Figure 13:
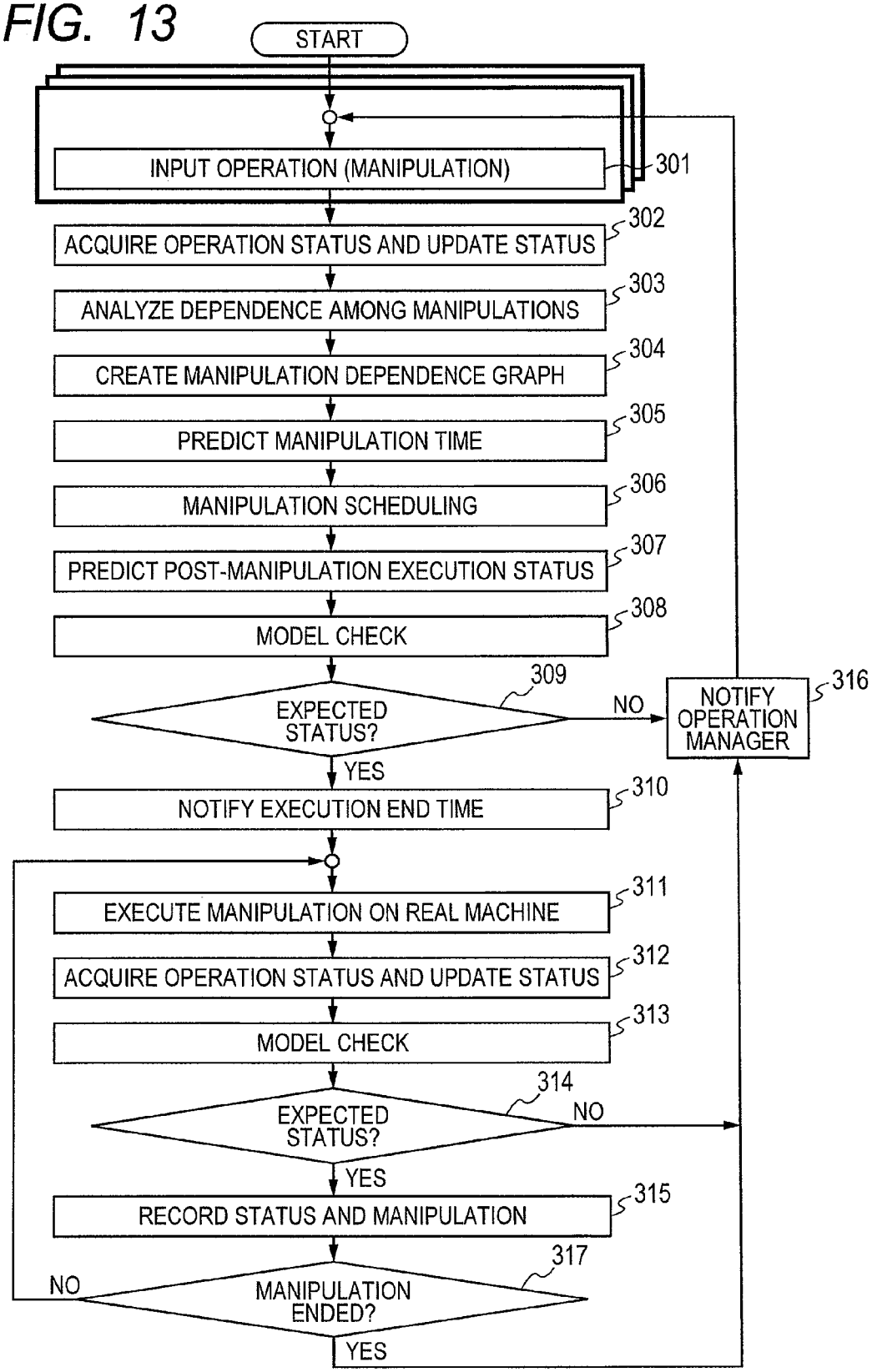
FIG. 13 is a flowchart that shows a process flow of verification and optimization of operations according to the first embodiment.

A process flow of verifying/optimizing operations input by an operation manger in the operation managing server 100, the operation verifying server 101, and the operation model managing server 102 is explained using FIG. 13. The process flow is realized by a program process and the like of CPUs in the operation managing server 100, the operation verifying server 101 and the operation model managing server 102 that configure the operation managing unit, and is executed in any of the operation managing server 100, the operation verifying server 101 and the operation model managing server 102 configuring the operation managing unit, or each process is dispersed to and executed by each server.

First, an operation manger inputs an operation (manipulation) to operation management subject equipment on the operation terminal 103 connected to the operation managing server 100 (301). The operation is input by selecting a manipulation from among manipulations defined in advance in the manipulation table 125. At this time, a plurality of managers may input operations to common or different equipment at a same timing, or a single manager may input a plurality of operations simultaneously. To cope with this, operations are grouped according to times, types of operations, or subject equipment, and verification and optimization are performed for each group.

After inputting operations, a latest status of manipulation subject equipment is acquired, and a status on a model is updated (302). Specifically, various status values defined in the status definition 232 of the equipment definition table 123 are updated. A method of acquiring an operation status may be by analyzing various logs retained in subject equipment or by executing an agent program and the like on various types of equipment. Next, for a plurality of input, grouped operations, the operation verifying server 101 performs analysis of dependence among operations (303). Operations are associated with manipulations defined in the manipulation table 125, and dependence analysis is performed for each manipulation. The dependence analysis in the operation verifying server 101 confirms whether a prerequisite for performing a manipulation is met using the manipulation conditions 253 in the manipulation table 125 and dependence in the dependence table 124, and whether a post-manipulation status condition is met using the status rule table 122 to create a manipulation dependence graph for deciding an execution order of manipulations and a possibility of parallel execution (304). Next, an execution time of each manipulation is predicted on the operation verifying server 101 (305). The execution time prediction is performed using the manipulation time prediction table 126. An execution time is decided using a calculation formula or time information based on past actual measurement on the table.

Next, the operation verifying server 101 performs manipulation scheduling of deciding an order and a timing of executing a manipulation based on the manipulation dependence graph and the manipulation time prediction (306). An execution order and an execution timing of each manipulation and an execution end timing of each manipulation can be obtained with the manipulation scheduling. Next, the operation verifying server 101 predicts a final status based on a status change due to a manipulation as a status after an operation execution (307). Next, the operation verifying server 101 model-checks to confirm whether the status is an expected status for the operation and whether steady conditions among statuses are met using the status rule table 122 or the dependence table 124 (308).

When the result shows that a status after a change due to the manipulation is not as expected (309), the operation managing server 100 notifies an operation manager and prompts the operation manager to confirm whether there is an error in an input manipulation (316). Also, when the result of the model check 308 shows that a status after a change due to the manipulation is as expected (309), the operation managing server 100 notifies the operation manager of status items to be confirmed for verifying whether execution of each manipulation has been performed correctly based on a predicted end timing of each manipulation obtained from the result of the manipulation scheduling 306 and a post-manipulation timing 254 in the manipulation table 125 (310). This allows the operation manager to know a timing to confirm an execution status sequentially and a status item to be confirmed in executing the manipulations on a real machine.

Thereafter, for example, the operation managing server 100 issues a manipulation to each equipment at a timing indicated in the manipulation scheduling 306, and each manipulation is executed (311). When a single manipulation ends, a latest status of manipulation subject equipment is acquired, and a status on a model is updated (312). Then, the operation verifying server 101 performs model check to confirm whether a status after a change due to the manipulation performed on the real machine is as expected (313). If the post-change status is not as expected (309), the manipulation is suspended, and the operation manager is notified via the operation managing server 100, and prompted to confirm whether there is an error in the input manipulation (316). If the status after a change due to the manipulation is as expected (309), the status and the manipulation of the equipment acquired at the process 312 is recorded in the status record table 128 and the manipulation record table 129 of the operation model managing server 102, respectively (315).

Thereafter, if all the manipulations have not ended yet (317), the following manipulation execution is repeated (311 to 315), and if all the manipulations have ended (317), the operation managing server 100 notifies the operation manager of the normal end (316), and returns to an operation-input stand-by status. Although in this process flow, acquisition of a latest status of manipulation subject equipment and model check of a status after a change due to a manipulation are repeated for each manipulation sequentially, model check of a status after a change due to a plurality of groups of manipulations may be performed in a lump after executing the groups.

<Process Flow at the Time Other than Times of Operation Performance>

Figure 14:
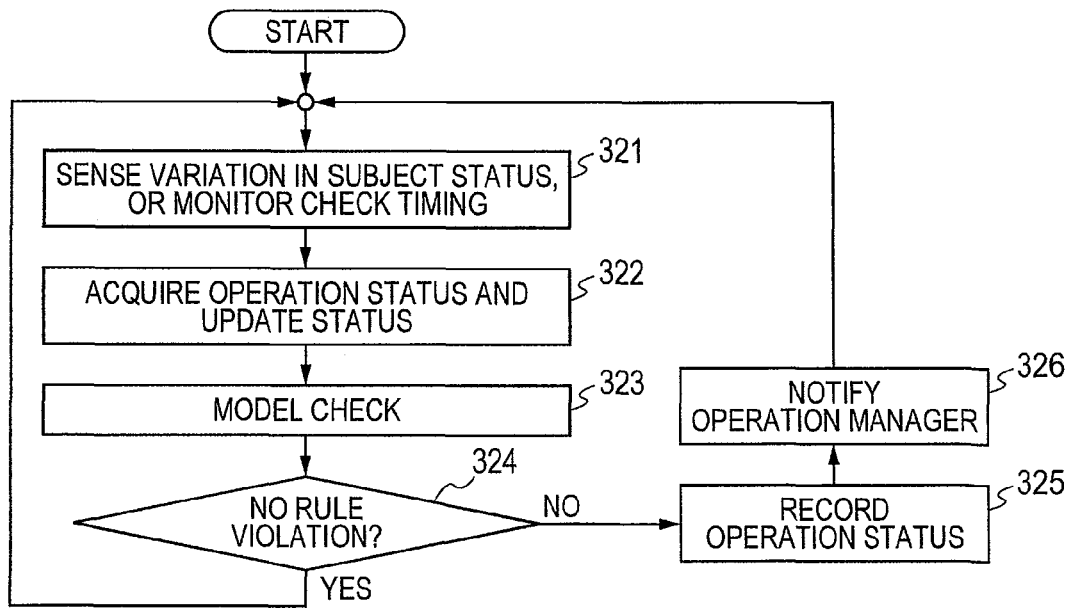
FIG. 14 is a flowchart that shows a process flow of checking operation statuses and equipment statuses at the time other than times of operation performance according to the first embodiment.

Next, an equipment status verification process flow at a steady state other than times of operation performance on operation management subject equipment is explained using FIG. 14. The process flow is executed by any of the operation managing server 100, the operation verifying server 101 and the operation model managing server 102 configuring the operation managing unit, or each process is dispersed to and executed by each server.

First, a real machine status of operation management subject equipment corresponding to statuses defined in the status table 121 and the equipment definition table 123 is monitored (321). The method of monitoring may be by detecting a status variation of a subject by analyzing a log retained by the equipment or by detecting a status variation of a subject by executing an agent program and the like on the equipment. Also, other than a status monitoring, a status check and update may be performed regularly (321). In this case, an operation status of equipment may be checked at intervals of the update frequency 214 defined in the status table 121, or the procedure may proceed to a next step 322 at the update frequency.

After a status of a monitoring subject has varied, or a time of the update frequency has come, acquisition of an operation status of the subject equipment and status update of a tentative equipment definition table corresponding to the status definition 232 of the equipment definition table 123 are performed (322). Thereafter, the status is compared with the status definition 232 of the equipment definition table 123 that defines an appropriate steady status to check whether the status matches with the status definition, and it is model-checked using the status rule table 122 or the dependence table 124 whether a steady condition among the statuses is met. If the result shows that there is not a mismatch or violation, sensing of a status variation or monitoring of a check timing (321) is repeated again. If there is a mismatch or violation, the status definition in the tentative equipment definition table is recorded as the status record table 128 (325), and is notified to the operation manager via the operation managing server 100 (326).

<Flow of Status Acquisition by Log Analysis>

Figure 15:
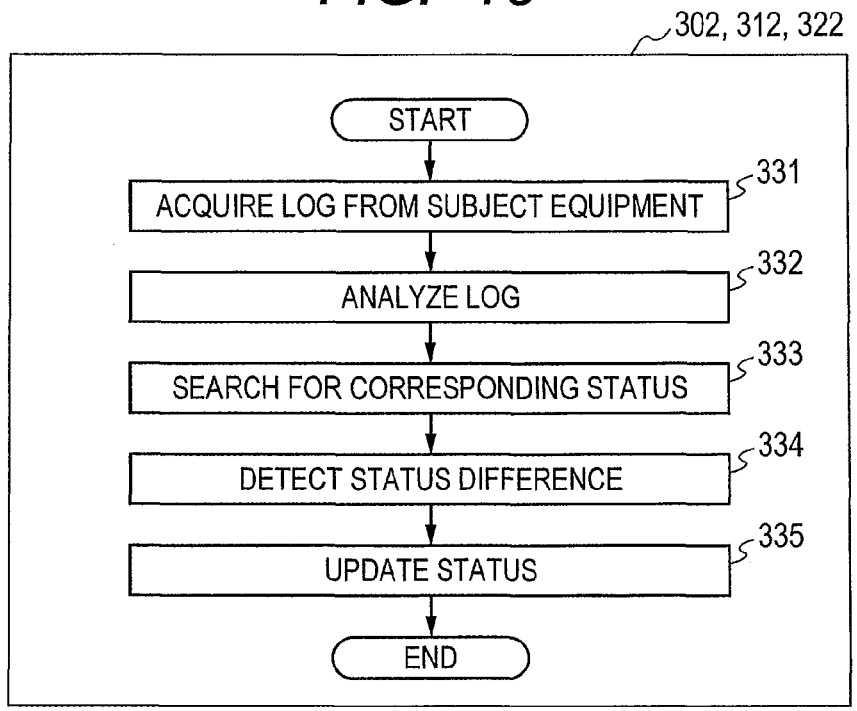
FIG. 15 is a flowchart that explains a detailed flow of acquiring operation statuses from a log and updating statuses according to the first embodiment.

Next, a detailed flow of the operation status acquisition and the status updates 302, 312, 322 in FIGS. 13 and 14 are explained using FIG. 15. As described above, in this process, a latest status of manipulation subject equipment is acquired, and various status values defined in the status definition 232 of the equipment definition table 123 are updated. FIG. 15 shows a flow of acquiring and updating statuses by analyzing a log retained by the operation management subject equipment 104 to 110. Although in the following explanation, this flow is executed by the operation verifying server 101, but the flow may be executed by the operation managing server 100 or the operation model managing server 102. Also, part of the process may be divided to and executed on the side of the manipulation subject equipment that retains a log.

First, in FIG. 15, a log retained by the operation management subject equipment is acquired via the managing network 113 (331). By acquiring a difference from previous acquisition as a log to be acquired, the time required for acquisition can be shortened. Next, the acquired log is analyzed (332). In analyzing the log, a keyword corresponding to status information to be an acquisition subject is input in advance, and the content of the log and the keyword are collated to perform provision of meaning to the log and extraction of a corresponding parameter. As described above, the steps 331 and 332 may be performed on the side of the operation management subject equipment that retains the log. This provides an advantage in remote management because the amount of information that goes through the managing network 113 becomes small, but there is a disadvantage that computational resource of the subject equipment is partly occupied. Next, the status table 121 is searched based on the meaning of the log and the result of the parameter extraction, and a status registered in the table is searched for (333). If the result shows that there is a difference between the registered status and the extracted status, it is recorded that there is a difference (334), and the status in the table 121 is updated (335).

<Specific Example of Operation Optimization>

Next, an example of performing three types of operation management tasks is explained using FIG. 16 as a specific example of the operation optimization in the present embodiment. In a table 400 in FIG. 16, numerals 401 to 403 show three types of operation management tasks A, B, C, respectively. It is assumed that the three tasks are performed simultaneously by three operation managers or the tasks are performed simultaneously by a single manager. The task A (401) reactivates a server and activates a virtual server. Manipulations performed in the task A are, as defined in an operation list of the table 400: a manipulation 410 of turning off the power source of the physical server "ps1"; a manipulation 411 of turning on the power source of "ps1"; and a manipulation 412 of specifying a host server of the virtual server "vm1". In this example, the manipulations in the operation list are performed in the order of the list. In other words, a task does not include manipulations that can be executed simultaneously. However, a task may include manipulations that can be executed simultaneously. In such a case, the manipulations need to be defined as a group of manipulations that can be executed simultaneously at the time of inputting operations. The task B (402) performs a fixed-time batch process, and the task C (403) performs a fixed-time backup process. A priority can be set for each task which is used in the manipulation scheduling 306 for deciding an execution order of a plurality of manipulations under a condition that the manipulations can be executed. In this example, a priority is indicated with 1 to 10, and a larger number means a higher priority.

<Example of Manipulation Dependence Graph>

Next, a manipulation of a type of an operation task shown in the table 400 is optimized based on the process flow explained in FIG. 13. Analysis of dependence among the manipulation is performed (303). An example of the manipulation dependence graph indicating dependence among manipulations is shown in FIG. 17.

Figure 17:
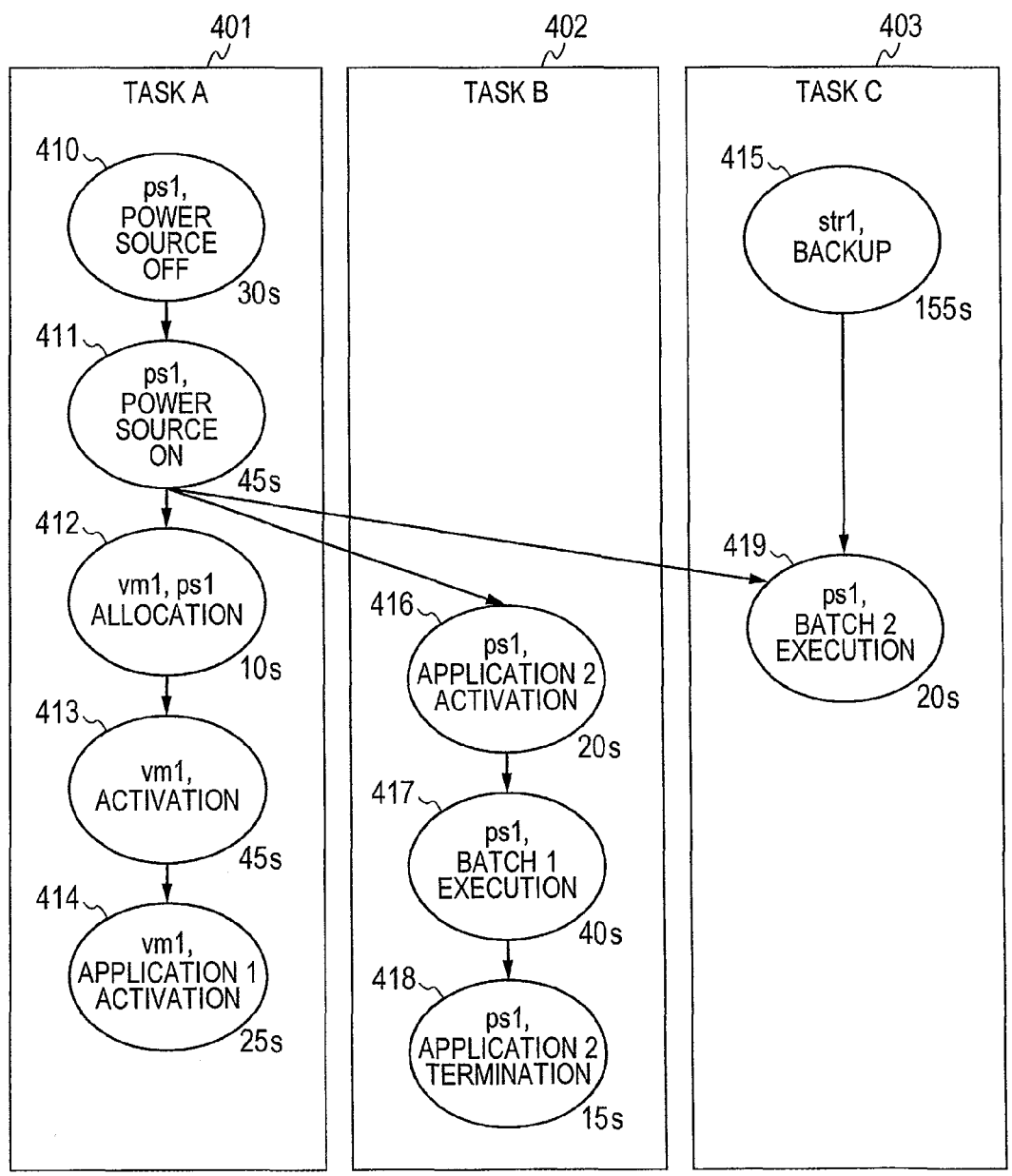
FIG. 17 is a diagram that explains a manipulation dependence graph according to the first embodiment.

The manipulation dependence graph in FIG. 17 is created from the manipulation table 125 shown in FIG. 8. Circles indicate manipulations, and arrows indicate dependence. Also, numeral values shown to the lower right of circles indicate manipulation times. For example, the manipulation 411 (turning on the power source of the physical server "ps1") of the task A (401) is dependent of the manipulation 410 (turning off the power source of "ps1"), and becomes operable after the manipulation 410. Likewise, a manipulation 416 (activating an application 2 on "ps1") of the task B (402) is dependent on the manipulation 411 (turning on the power source of "ps1") because "ps1" is required to be activated, and becomes operable after the manipulation 411. Also, a manipulation 415 (backing up the disk device "str1") of the task C (403) which is not dependent on any manipulation can be executed simultaneously with the manipulation 410 of the task A (401) for example. In this manner, by expressing dependence among all the manipulations in a graph, an execution order can be decided, and manipulations that can be executed in parallel can be extracted. When the manipulations are not executed simultaneously for reasons such as device performance, a condition corresponding to the manipulation condition 253 of the manipulation table 125 is required to be clearly stated.

<Example of Manipulation Scheduling Result>

In the manipulation scheduling 306 of FIG. 12, a final timing of issuance of each manipulation is decided based on the manipulation dependence graph of FIG. 17, and manipulation time of each manipulation. An exemplary result of scheduling is shown in FIG. 18.

Figure 18:
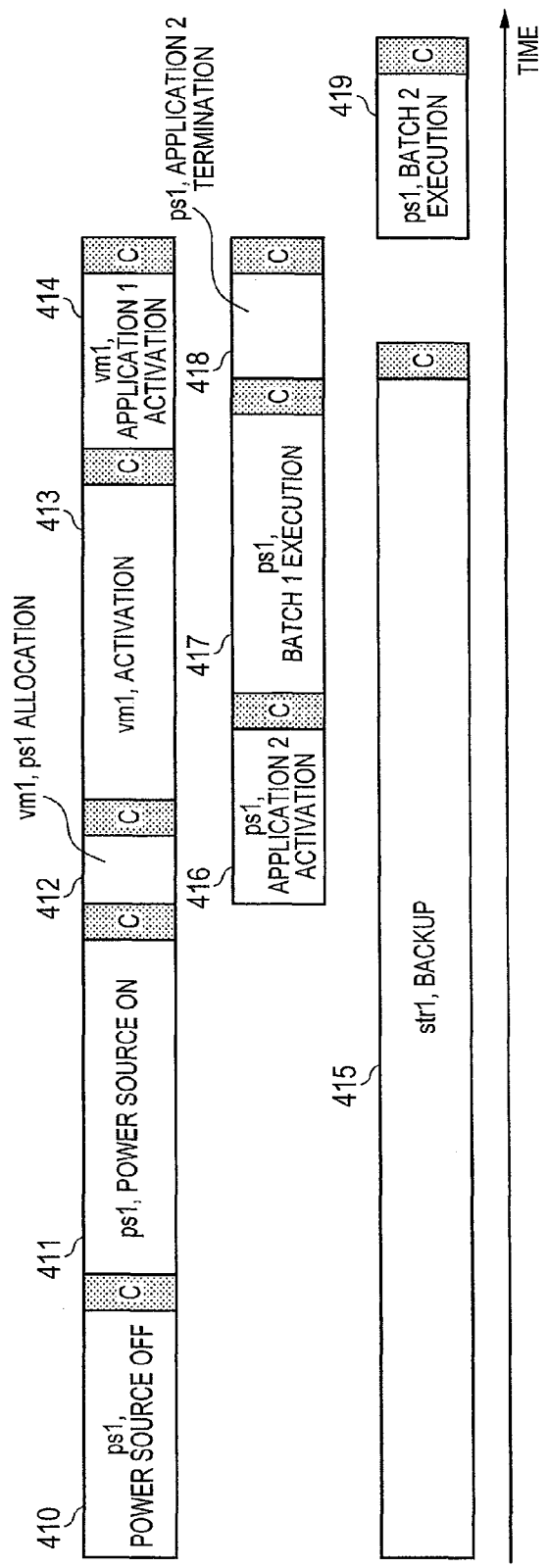
FIG. 18 is a diagram that explains a manipulation scheduling result according to the first embodiment.

In FIG. 18, a horizontal axis shows time, and a rectangle indicates a single manipulation. Also, a rectangle with a letter C indicates a timing to confirm a result of a last manipulation. In the scheduling, manipulations are allocated starting from that on the top of the manipulation dependence graph. However, when a plurality of manipulations of different tasks can be issued for same equipment, allocation is decided utilizing a priority for each task as described above.

In the manipulation dependence graph of FIG. 17, the manipulation 410 (turning off the power source of the physical server "ps1") and the manipulation 415 (backing up the disk device "str1") can be executed first, and are allocated. The manipulation time of the manipulation 410 is 30 seconds judging from FIG. 17, and that of the manipulation 415 is 155 seconds. Accordingly, execution confirmation of the manipulation 410 becomes possible in 30 seconds, and then the manipulation 411 (turning on the power source of "ps1") can be allocated. Subsequently, the manipulation time of the manipulation 411 is 45 seconds, and after the time, the manipulation 411 can be confirmed.

Thereafter, the manipulation 412 (allocating "ps1" to the virtual server "vm1") and the manipulation 416 (activating the application 2 on "ps1") can be allocated. The manipulation 412 and the manipulation 416 that can be executed simultaneously are allocated simultaneously. The manipulation time of the manipulation 412 is 10 seconds, the manipulation time of the manipulation 416 is 20 seconds, and after the manipulation 412 ends, a manipulation 413 (activating "vm1") is allocated. Likewise, after the manipulation 416 ends, a manipulation 417 (executing the batch 1 on "ps1") is allocated, and after the manipulation 413 ends, a manipulation 414 (activating the application 1 on "vm1") is allocated. Also, after the manipulation 417 ends, a manipulation 418 (terminating the application 2 on "ps1") is allocated.

Because at the time when the manipulation 415 on which a manipulation 419 of the task C is dependent has ended, the manipulation 411 on which the manipulation 419 is also dependent has ended, the manipulation 419 can be allocated immediately after the manipulation 415 ends according to the manipulation dependence graph. However, because according to "SERV.user_process<=2" defined in the manipulation condition 253 of the batch execution manipulation "exec_batch" of the manipulation table 125, two processes of the virtual server "vm1" and the application 2 are already in operation on "ps1", the manipulation 419 cannot be allocated immediately after the manipulation 415 ends. Accordingly, the manipulation 419 is allocated after terminating the application 2 in the manipulation 418.

<Example of Log on Operation Management Subject Equipment>

FIG. 19 shows an example of a log (450) acquired on the physical server "ps1" when an operation is performed based on the scheduling result shown in FIG. 18. In FIG. 19, the leftmost numbers indicate row numbers. The log is configured with date, time, equipment name, service name and message. For example, the second row shows, at 10:10:02 on May 2, as a message of a kernel service executed on the physical server "ps1", a system shutdown is started.

<Operation Input Confirmation Screen>

Figure 20:
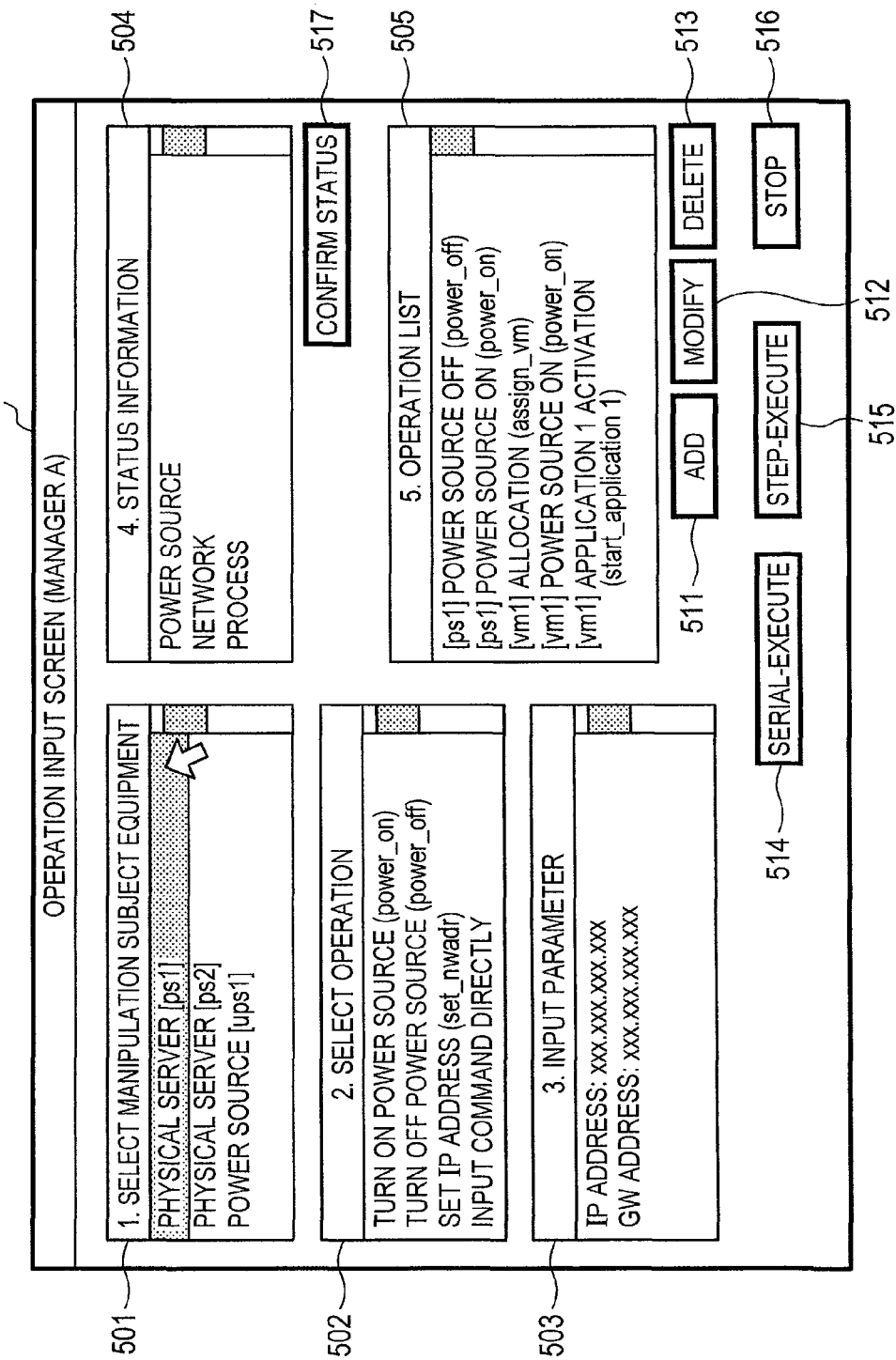
FIG. 20 is a diagram that explains an operation input screen according to the first embodiment.

Next, a method of confirming input of operations by an operation manager and a result of operation verification is explained by showing a screen configuration example on the operation terminal 103. FIG. 20 is a figure that shows an example of an operation input screen 500. The screen 500 is displayed for each operation manager or for each operation management task, and each manipulation is input. In this example, the screen 500 is for each operation manager.

The operation manager first selects equipment on "Select Manipulation Subject Equipment" 501. After the manipulation subject equipment is selected, a list of manipulations that can be performed on the equipment is displayed on "Select Operation" 502. Accordingly, a manipulation to be performed on the equipment is selected. After the selection, parameter items required for the manipulation are displayed on "Input Parameter" 503. After selecting a parameter, a screen to prompt the operation manager to input a corresponding parameter is displayed additionally.

Also, a current status of the equipment selected at "Select Manipulation Subject Equipment" 501 can be acquired and referred to. By selecting a status item displayed on "Status Information" 504 and pressing "Confirm Status" button 517, the status of the equipment is displayed in another screen. After completing input of a single manipulation, the manipulation can be registered in an operation list by pressing "Add" button 511. By repeating the processes, operations of a plurality of manipulation groups are input. Modification and deletion of a manipulation in the operation list are performed by selecting the subject manipulation and then pressing "Modify" button 512 and "Delete" button 513.

After input of all the operations ends, "Serial-Execute" button 514 or "Step-Execute" button 515 is pressed to start verification and optimization of operations, and execution on real machines. When the "Serial-Execute" button 514 is pressed, verification and optimization of a manipulation group in the operation list are performed, and then if there is not a problem, manipulations are issued in a lamp, and a screen indicating an execution status 520 is displayed. After execution of all the manipulations ends, a screen to confirm a result is displayed. Also, when the "Step-Execute" button 515 is pressed, verification and optimization of the manipulation group are performed, and then if there is not a problem, the screen indicating an execution status 520 is displayed, and execution of each manipulation is sequentially instructed. Furthermore, at each manipulation execution, a screen to confirm a result 530 is displayed. Also, when an error is detected in the operation verification step before the manipulation execution, an operation error notification screen 550 is displayed.

Figure 21:
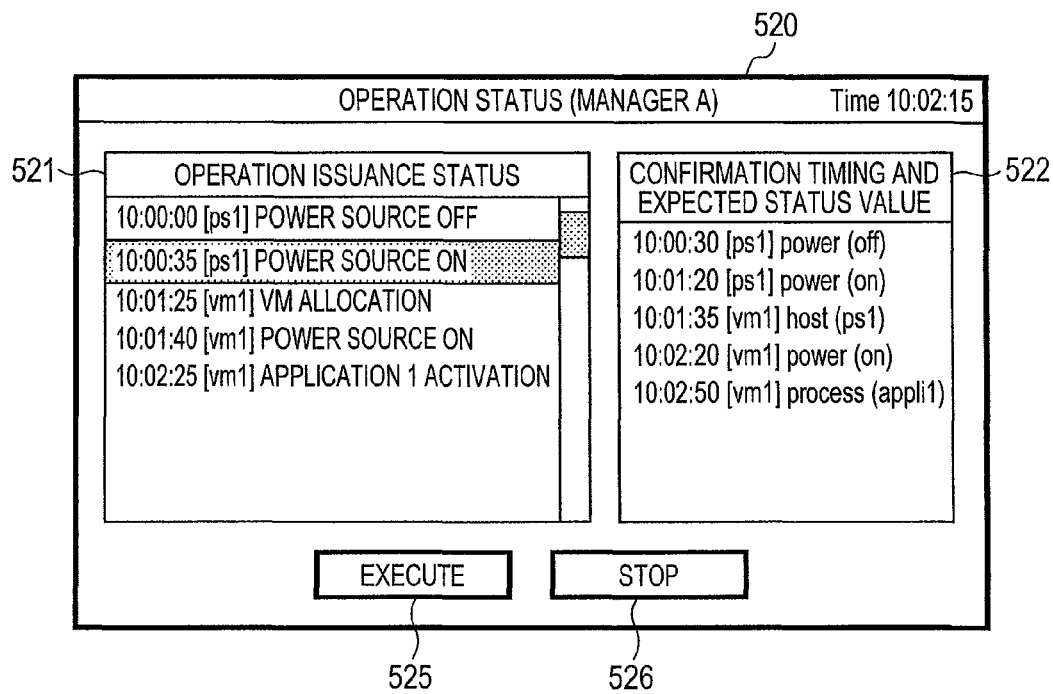
FIG. 21 is a diagram that explains an operation confirmation screen according to the first embodiment.

Next, the screen displaying a status of an operation 520 is explained using FIG. 21. For an operation issued for each operation manager or operation management task, an operation issuance status 521 and a confirmation timing and expected status value 522 are shown. In the operation issuance status 521, a list of issuance time, subject equipment and manipulation content of each manipulation is displayed. A manipulation that is currently being executed is highlighted. In the confirmation timing and expected status value 522, a time to confirm a result of each manipulation, a status to be confirmed and an expected value thereof are displayed. For example, the top row of the confirmation timing and expected status value 522 shows that the confirmation time is 10:00:30, the subject equipment is the physical server "ps1", the status item to be confirmed is "power" and the expected status value is "off". To stop an operation that is being executed, "Stop" button 526 is pressed. Also, when the "Step-Execute" button 515 is pressed on the operation input screen 500, the system enters a stand-by status every time issuance of each manipulation ends, and "Execute" button 525 becomes operable. When a next manipulation is executed after confirming the operation confirmation screen 530, the "Execute" button 525 is pressed. When the "Serial-Execute" button 514 is pressed on the operation input screen 500, the "Execute" button 525 does not become operable.

Figure 22:
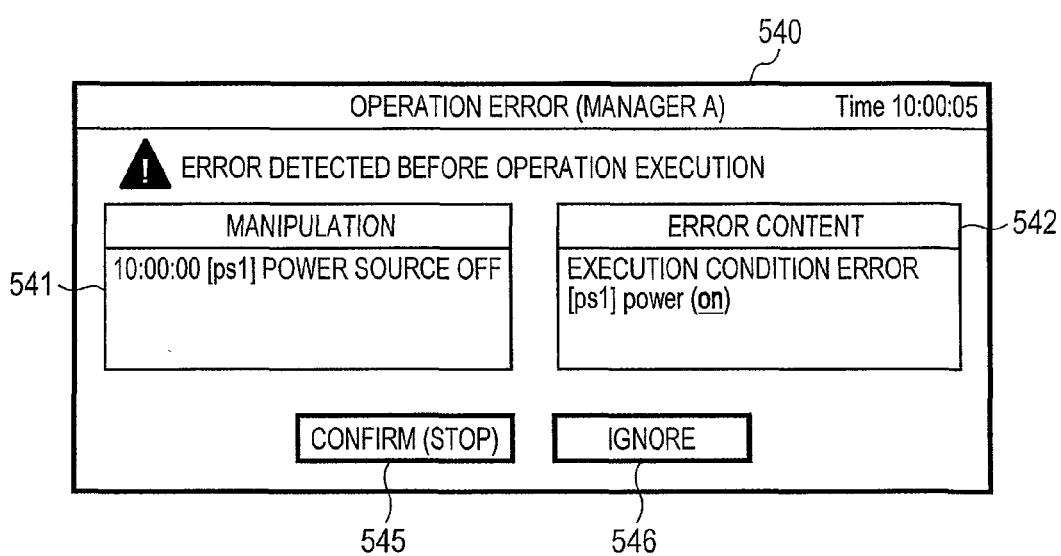
FIG. 22 is a diagram that explains a screen that displays an error detected before executing an operation according to the first embodiment.

Next, a confirmation screen at the time when an error is detected before executing an operation 540 is explained using FIG. 22. In the operation error display screen 540, an error detected in the operation verification step as shown in FIG. 20 is displayed. The operation error display screen 540 is configured with a screen showing a manipulation in which an error has occurred 541, and a screen showing an error content 542. The error content 542 in this example shows that the status of the power source of the physical server "ps1" is not "on" for a manipulation of turning off the power source of the physical server "ps1". When the operation is to be stopped in response to the error, "Confirm (Stop)" button 545 is pressed, and when the error is ignored, "Ignore" button 546 is pressed.

Figure 23:
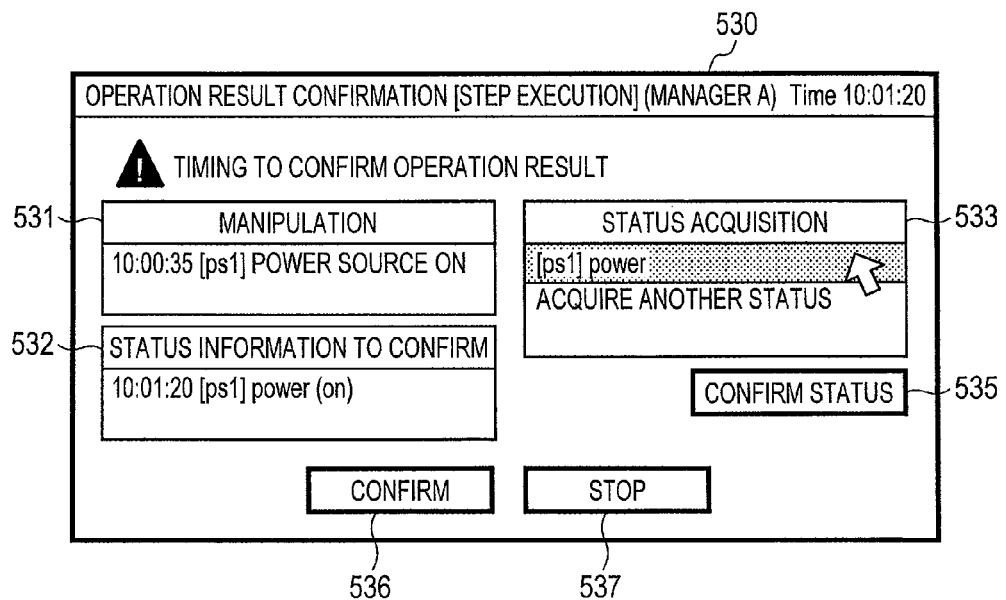
FIG. 23 is a diagram that explains an operation confirmation screen at the time of step execution.

As shown in FIG. 23, a screen displaying a manipulation to be confirmed 531 and a screen showing status information to be confirmed 532 are displayed on the confirmation screen 530 of an operation result at the time of step execution. Also, a screen to confirm a status 533 is displayed. A subject status is displayed on the screen 533 based on the status information to be confirmed, and when "Confirm Status" button 535 is pressed, the status is acquired and the content is displayed on another screen. To confirm another status or a status of other equipment, "Acquire Another Status" is selected, and the "Confirm Status" button 535 is pressed to display another screen to confirm a status. If there is not a problem in the result, by pressing "Confirm" button 536, execution confirmation of the manipulation ends, and the procedure shifts to execution of a next manipulation. If there is a problem such as a difference from an expected status, "Stop" button 537 is pressed to stop the operation.

Figure 24:
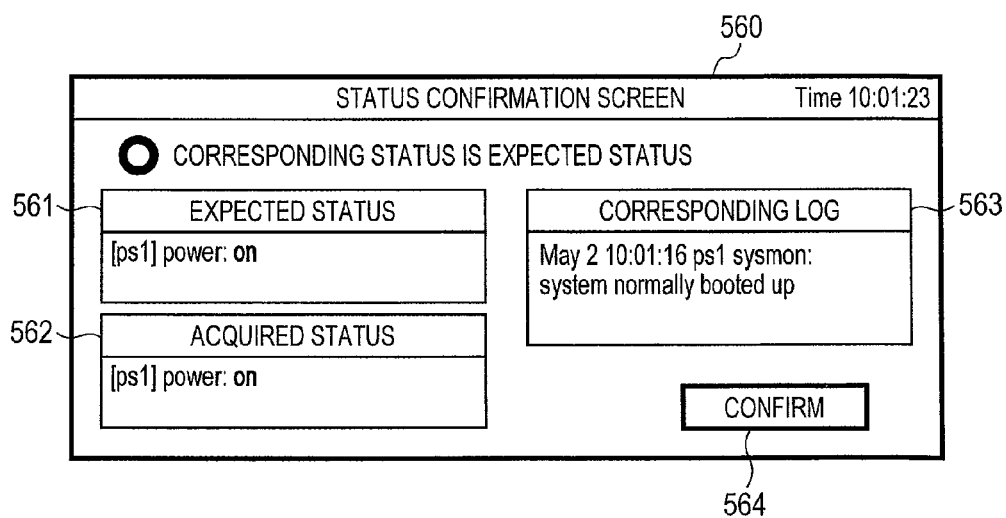
FIG. 24 is a diagram that explains a status confirmation screen when a status matches with an expected status according to the first embodiment.

Next, a screen to be displayed when the "Confirm Status" button 535 is pressed is explained using FIG. 24. FIG. 24 shows a status confirmation screen when a status to be confirmed matches with an actual equipment status 560 (i.e. there is not an operation error). A screen indicating an expected status 561, a screen indicating an acquired status of operation management subject equipment 562, and a screen indicating a corresponding part of a log output on the operation management subject equipment to be a ground for the acquired status 563 are displayed. This example shows that the power source of the physical server "ps1" is turned on and is booted normally. This allows operation managers to confirm sequentially that a result after execution is correct. By pressing "Confirm" button 564, the status confirmation screen 560 ends.

Figure 25:
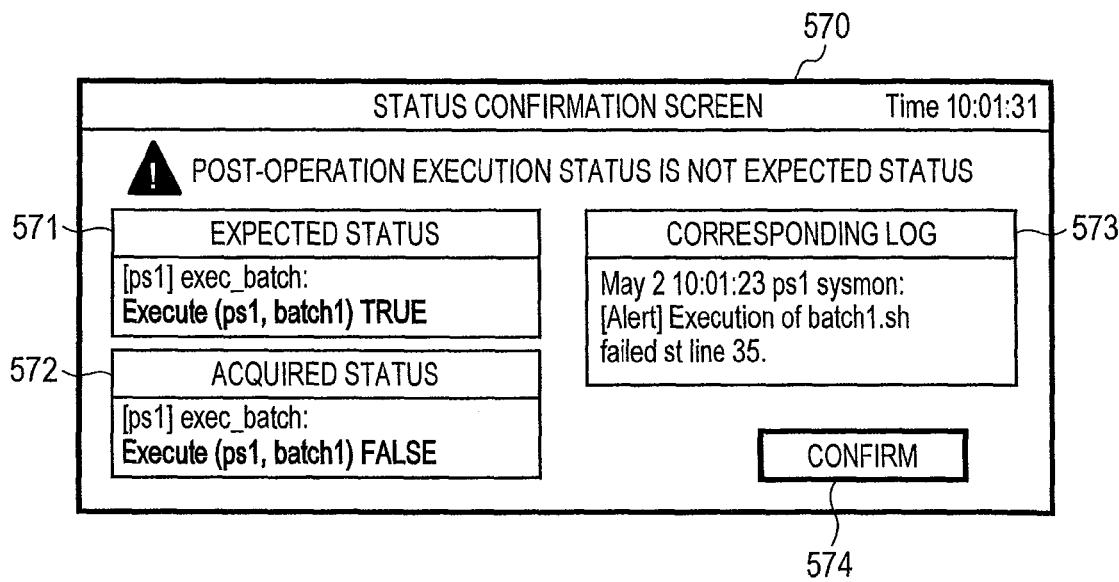
FIG. 25 is diagram that explains a status confirmation screen when a status does not match with an expected status according to the first embodiment.

Also, FIG. 25 shows a status confirmation screen when a status to be confirmed does not match with an actual equipment status 570 (i.e. there is an operation error). Similarly, the screen indicating an expected status 561, the screen indicating an acquired status of operation management subject equipment 562, and the screen indicating a corresponding part of a log output on the operation management subject equipment to be a ground for the acquired status 563 are displayed. In this example, the batch "batch1" on the physical server "ps1" is not executed correctly to the end, and the status does not match with an expected status; accordingly, an error is output. This allows operation managers to confirm sequentially that there is an abnormality in an execution result. By pressing "Confirm" button 574, the status confirmation screen 570 ends.

Figure 26:
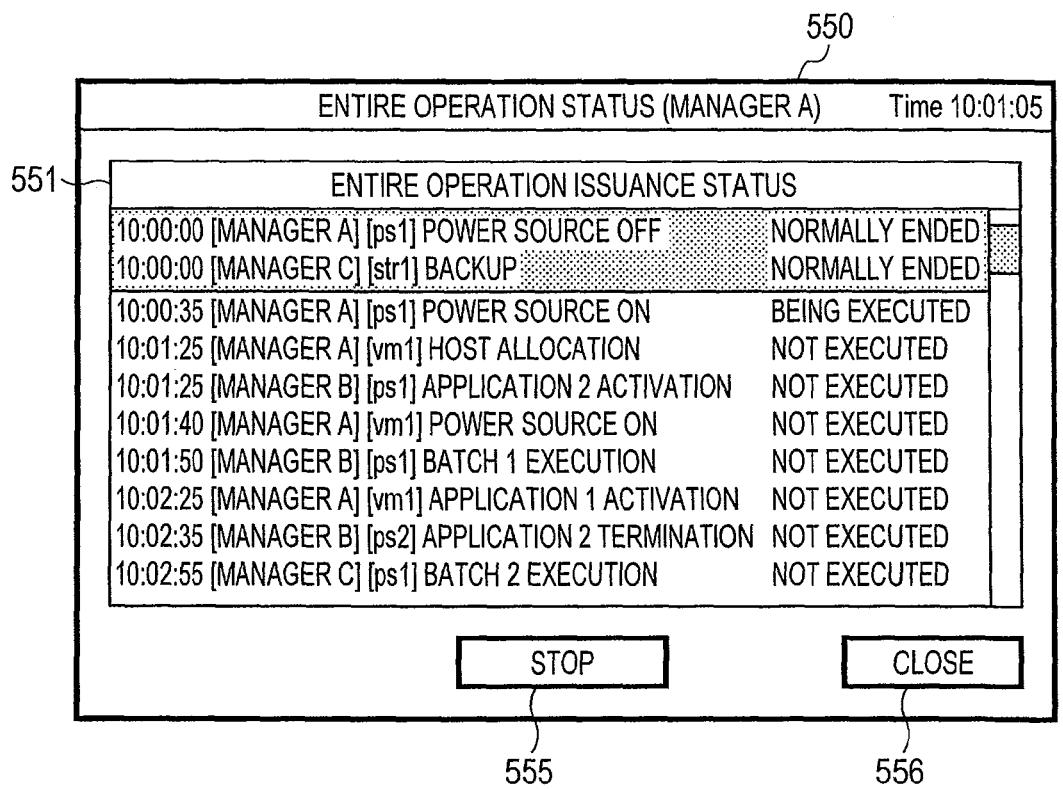
FIG. 26 is a diagram that explains a screen that displays execution statuses of all operations according to the first embodiment.

As shown in FIG. 26, all the manipulations and execution statuses thereof are displayed on the entire operation status display screen 550 when a plurality of operation managers have input operations. The screen 550 can be called up at any timing by operation managers. The list of manipulations displays items of execution time, issuer, subject equipment, manipulation content and execution status. In this example, highlighted parts are manipulations execution of which has ended. To stop the manipulations that are being executed, "Stop" button 555 is pressed.

Although the operation verification system of an embodiment of the present invention has so far been described in detail, the present invention is not limited to the embodiment, but includes various variants. For example, the embodiment is explained in detail to enhance understanding of the present invention, and the present invention is not necessarily limited to one provided with all components explained above. As explained in the embodiment, the operation control unit of the system may be configured with a plurality of server devices or may be configured with a single server device.

Also, a part or all of the configurations, functions, processing units, processing means and the like described above may be realized in hardware by designing of an integrated circuit for example. Also, the configurations, functions and the like are explained mainly by showing examples of realizing programs that are executed by CPUs to realize the functions in software, but information such as the programs, tables and files that realize each function may be recorded not only in a memory and a hard disk device, but also in recording devices such as a solid state drive (SSD) or in recording media such as an IC card, SD card and DVD, and the information may be downloaded via a network and the like as necessary and installed.

Correctness of a plurality of manipulations that are input can be verified before execution by modeling statuses of operation management subject equipment and the manipulations, and memorizing resources, manipulation conditions and manipulation time required for the manipulations. Also, an execution order can be optimized to minimize execution time of the plurality of manipulations. Also, correctness of manipulations can be confirmed easily by outputting items to be confirmed, for each manipulation, based on execution end timings and operation statuses of operation management subject equipment. As a result, an operation management task of a data center can be made efficient.

The invention claimed is:

1. An operation managing device comprising an operation managing unit that performs manipulations on a plurality of operation management subject equipment, wherein
the operation managing unit has a memory unit and a processing unit;
the memory unit stores a status of the operation management subject equipment that varies due to the manipulations, a manipulation time for each of the manipulations, a first status condition of the operation management subject equipment required for performing the manipulations, and a second status condition of equipment which is depended on by the operation management subject equipment required for the status of the operation management subject equipment; and
the processing unit confirms, when a plurality of the manipulations are input, whether the status of the operation management subject equipment meets the first status condition, and whether the status of the equipment which is depended on by operation management subject equipment after a manipulation on the operation management subject equipment meets the second status condition for each manipulation, and decides a manipulation order of the input manipulations according to results of the confirmations and the manipulation time.

2. The operation managing device according to claim 1, wherein the processing unit determines, when deciding the manipulation order of the manipulations, that there is an error in the input manipulations by detecting a manipulation that does not meet a manipulation condition.

3. The operation managing device according to claim 1, wherein the processing unit presents a timing to confirm each of the manipulations by outputting an end time of each of the manipulations.

4. The operation managing device according to claim 3, the device further comprising a display unit, wherein
the display unit displays a confirmation timing based on the end time of each of the manipulations obtained from the processing unit, and an expected status value at the confirmation timing.

5. The operation managing device according to claim 1, wherein
the processing unit monitors an operation status of the operation management subject equipment, and updates the status stored in the memory unit upon determining that the status of the operation management subject equipment is changed.

6. The operation managing device according to claim 5, wherein the processing unit determines that the status is changed based on an analysis result of a log retained in the operation management subject equipment.

7. The operation managing device according to claim 1, wherein the status of the operation management subject equipment stored in the memory unit includes a type or a range of a value corresponding to the status.

8. The operation managing device according to claim 7, wherein
the status of the operation management subject equipment stored in the memory unit further includes an update frequency of the status; and
the processing unit determines the status of the operation management subject equipment based on the update frequency.

9. The operation managing device according to claim 1, wherein the status condition stored in the memory unit includes a reference status of the status condition.

10. The operation managing device according to claim 1, wherein the manipulation time stored in the memory unit is stored in association with a manipulation name of a time prediction subject.

11. An operation management method performed by operation managing equipment having a memory unit and a processing unit that performs manipulations on a plurality of operation management subject equipment, the method comprising:
storing a status of the operation management subject equipment that varies due to the manipulations, a process time for each of the manipulations, a first status condition of the operation management subject equipment required for the manipulations and a second status condition of equipment which is depended on by the operation management subject equipment required for the status of the operation management subject equipment;

confirming, when a plurality of the manipulations are input, whether the status of the operation management subject equipment meets the first status condition, and whether the status of the equipment which is depended on by the operation management subject equipment after a manipulation on the operation management subject equipment meets the second status condition for each manipulation; and deciding a manipulation order of the manipulations according to results of the confirmations and the manipulation time.

12. The operation management method according to claim 11, wherein an error in the manipulations is determined by detecting, in deciding the manipulation order, a manipulation that does not meet a manipulation condition.

13. The operation management method according to claim 11, wherein a timing to confirm each of the manipulations is presented by outputting an end time of each of the manipulations.

14. The operation management method according to claim 11, including storing a status update frequency and updating the status of the operation management subject equipment according to an operation status of the operation management subject equipment based on the status update frequency.

15. The operation management method according to claim 11, including monitoring an operation status of the operation management subject equipment and updating the status of the operation management subject equipment upon determining that the operation status corresponding to the status of the operation management subject equipment is changed.

* * * * *